United States Patent [19]

Steiner

[11] 3,919,457
[45] Nov. 11, 1975

[54] ELECTRIFIED SUSPENSION CEILING SYSTEM

[76] Inventor: Sheldon Steiner, 184-61 Tudor Road, Jamaica, L. I., N.Y.

[22] Filed: Apr. 22, 1974

[21] Appl. No.: 462,861

[52] U.S. Cl. .............................. 174/48; 339/21 R
[51] Int. Cl.² .......................................... H02G 3/04
[58] Field of Search ........ 174/48, 49; 339/21 R, 20, 339/14 R

[56] References Cited
UNITED STATES PATENTS

| | | | |
|---|---|---|---|
| 3,246,074 | 4/1966 | Neumann et al. | 174/48 |
| 3,489,981 | 1/1970 | Corl et al. | 339/21 R |
| 3,559,146 | 1/1971 | Valtonen | 339/14 R |
| 3,649,741 | 3/1972 | Fremont | 174/48 |
| 3,686,614 | 8/1972 | Hyrylainen | 339/21 R |
| 3,710,530 | 1/1973 | Valtonen | 174/48 X |

*Primary Examiner*—J. V. Truhe
*Assistant Examiner*—David A. Tone

[57] ABSTRACT

An electrified suspension ceiling system is provided. The system includes a plurality of track members with each of the track members having generally parallel opposed side walls. The system further includes guide means spaced apart from and coextensive with at least one of the side walls and a cable in the form of a flat ribbon containing a plurality of vertically spaced conductors extending along the track retained in position between the side wall and guide means. The system further includes means for securing the tracks to a ceiling and means for making electrical connections to and from the cable.

16 Claims, 10 Drawing Figures

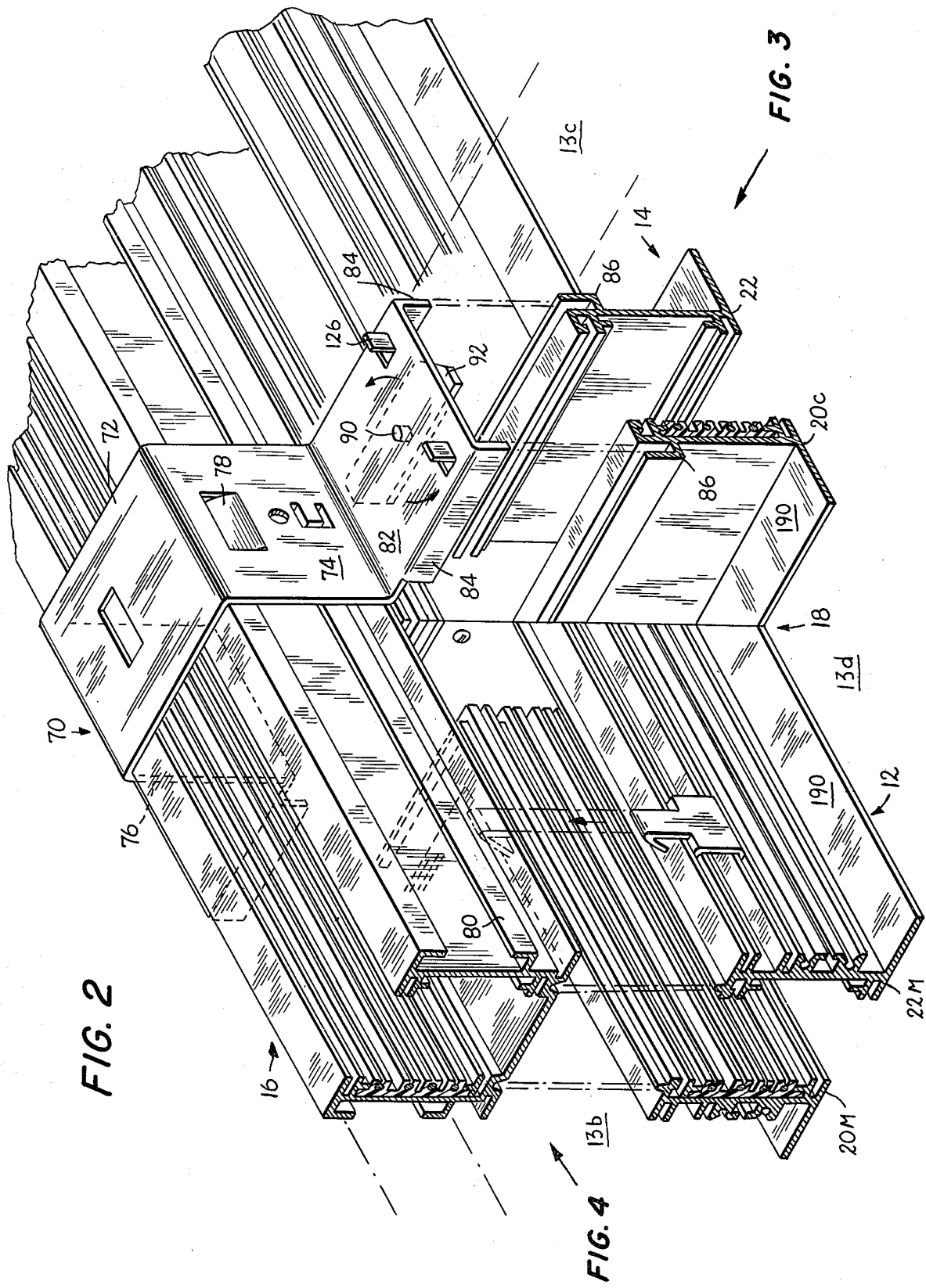

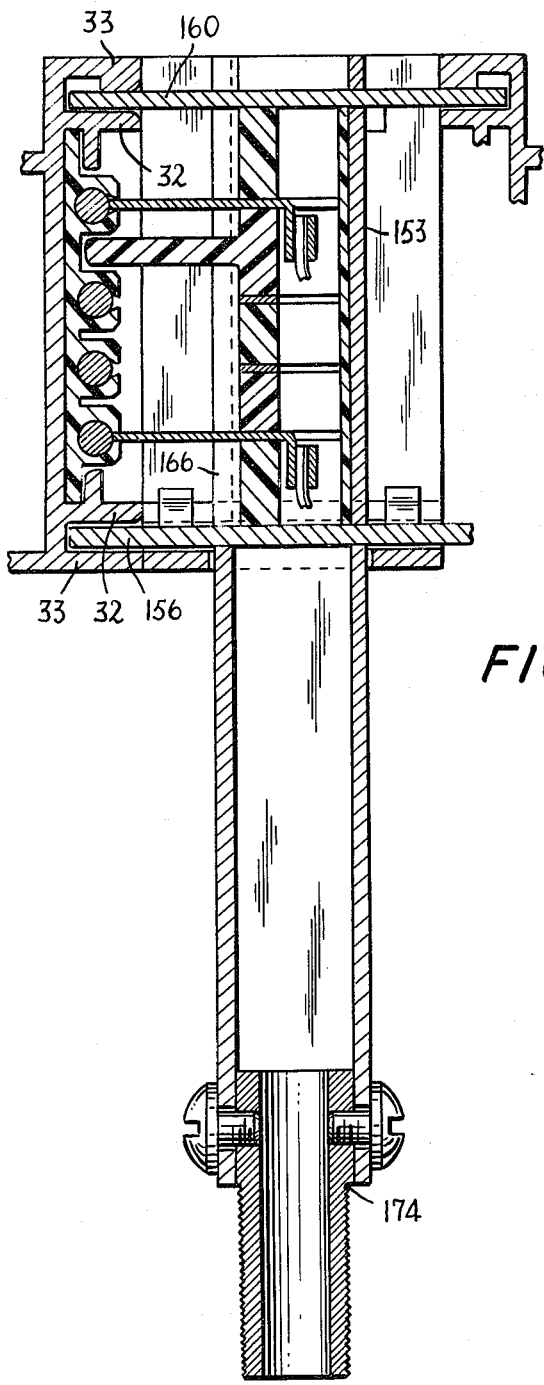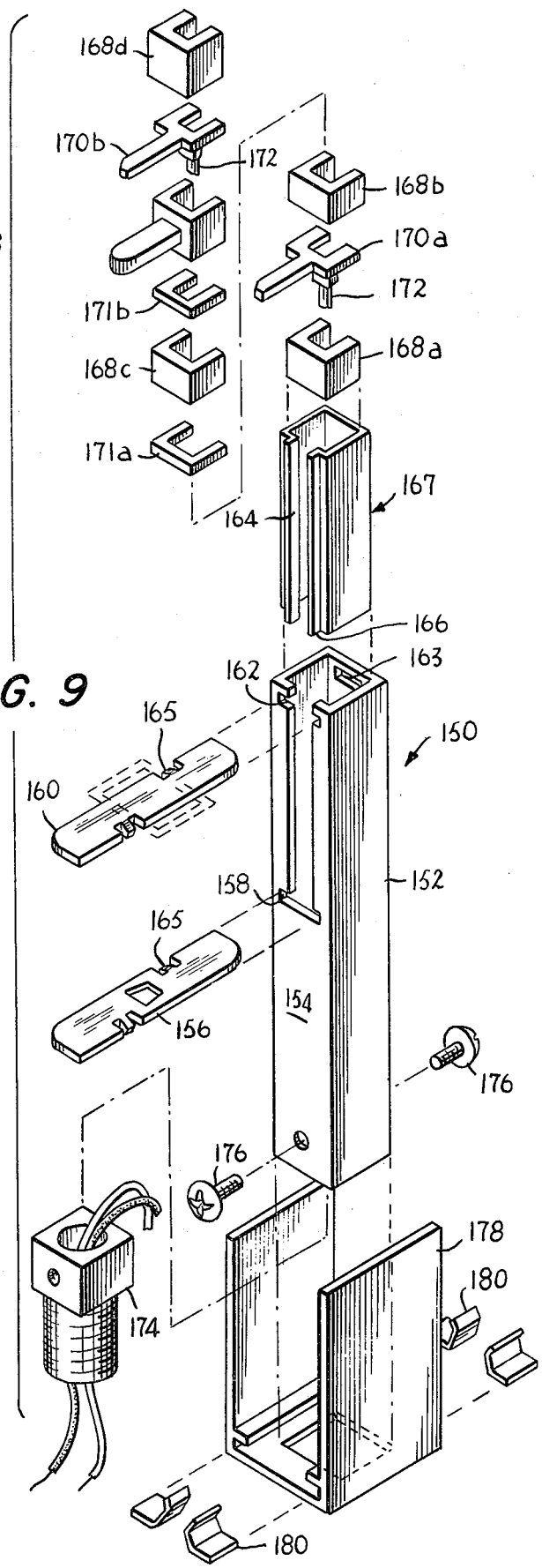

ELECTRIFIED SUSPENSION CEILING SYSTEM

BACKGROUND OF THE INVENTION

The present invention relates to suspended ceilings and more particularly to an electrified suspension ceiling system.

Suspension ceilings are extensively used in the construction industry for commercial and institutional installations. Such systems include a track network supported from the ceiling which, in turn, supports ceiling tiles and lighting fixtures. The track network may further cooperate in securing movable wall partitions in place as well as heating, ventilating and air conditioning ducts in position.

Heretofore, the electric circuitry that brings power to the lighting fixtures has been conventionally wired above the hung ceiling. Accordingly, once an installation was made, if additional fixtures or wall receptacles were desired or if the existing fixtures or receptacles were to be moved, it was necessary for an electrician to break into the existing circuitry to make the necessary connections sometimes involving great effort and time.

In view of the above, it is the principal object of the present invention to provide an improved suspension ceiling system incorporating means to simplify both the initial and subsequent wiring of electrical fixtures and receptacles to be used with the system.

SUMMARY OF THE INVENTION

The above and other beneficial objects and advantages are attained in accordance with the present invention by providing a suspension ceiling system incorporating support tracks each of which is provided with a flexible cable that serves as a power bus. The system also includes a plurality of track members with each of the track members having generally parallel opposed side walls. The system further includes guide means spaced apart from and co-extensive with at least one of the side walls. The system also includes a cable in the form of a flat ribbon containing a plurality of vertically spaced conductors extending along the track retained in position between the side wall and guide means. The system still further includes means for securing the tracks to a ceiling and means for making connections to and from the cable.

BRIEF DESCRIPTION OF THE DRAWINGS

In the accompanying drawings:

FIG. 2 is a partially exploded perspective view depicting details of the present system;

FIG. 9 is an exploded perspective view of a connector utilized to tap power to or from the track buses of the present system; and, FIG. 10 is a sectional view of the connector of FIG. 9 assembled and in position tapping power from a track bus.

DETAILED DESCRIPTION OF THE PREFERRED EMBODIMENT

Figure 1:
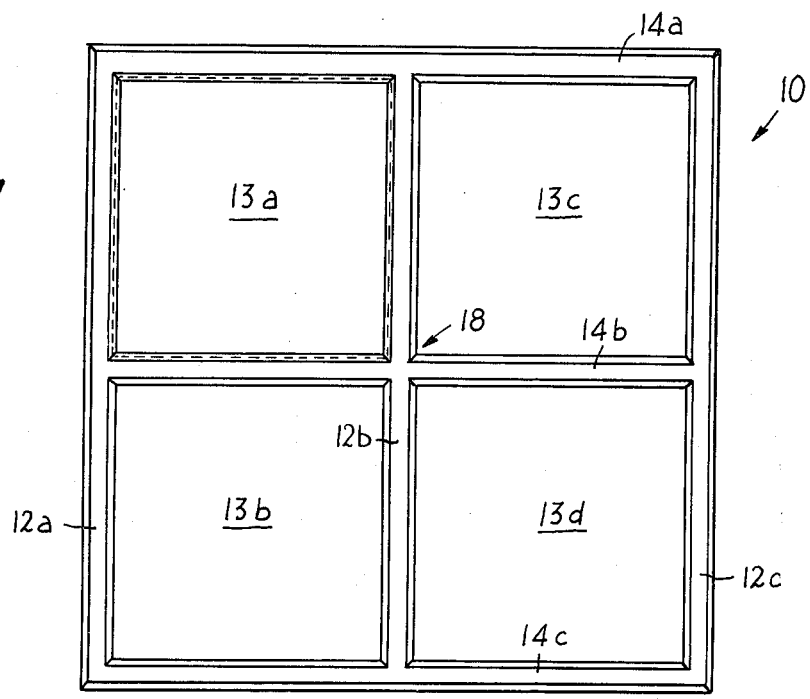
FIG. 1 is a plan view of track network for a suspension ceiling in accordance with the present invention.

Reference is now made to the drawings wherein similar components bear the same reference numerals throughout the several views. In FIG. 1, a suspension ceiling module 10 is depicted. It should be apparent from the outset that larger or smaller installations than that illustrated are possible. The module comprises main runners 12a, 12b and 12c and cross runners 14a, 14b and 14c arranged in a lattice defining four rectangular perimeters 13. As will be explained in detail forthwith, the module 10 is suspended from support channels which overlie the main runners. The support channels are secured to threaded rods suspended from the structure above at the installation site. Referring to FIG. 2, a support channel 16 is shown securing a typical splice joint 18 of the module 10.

Figure 3:
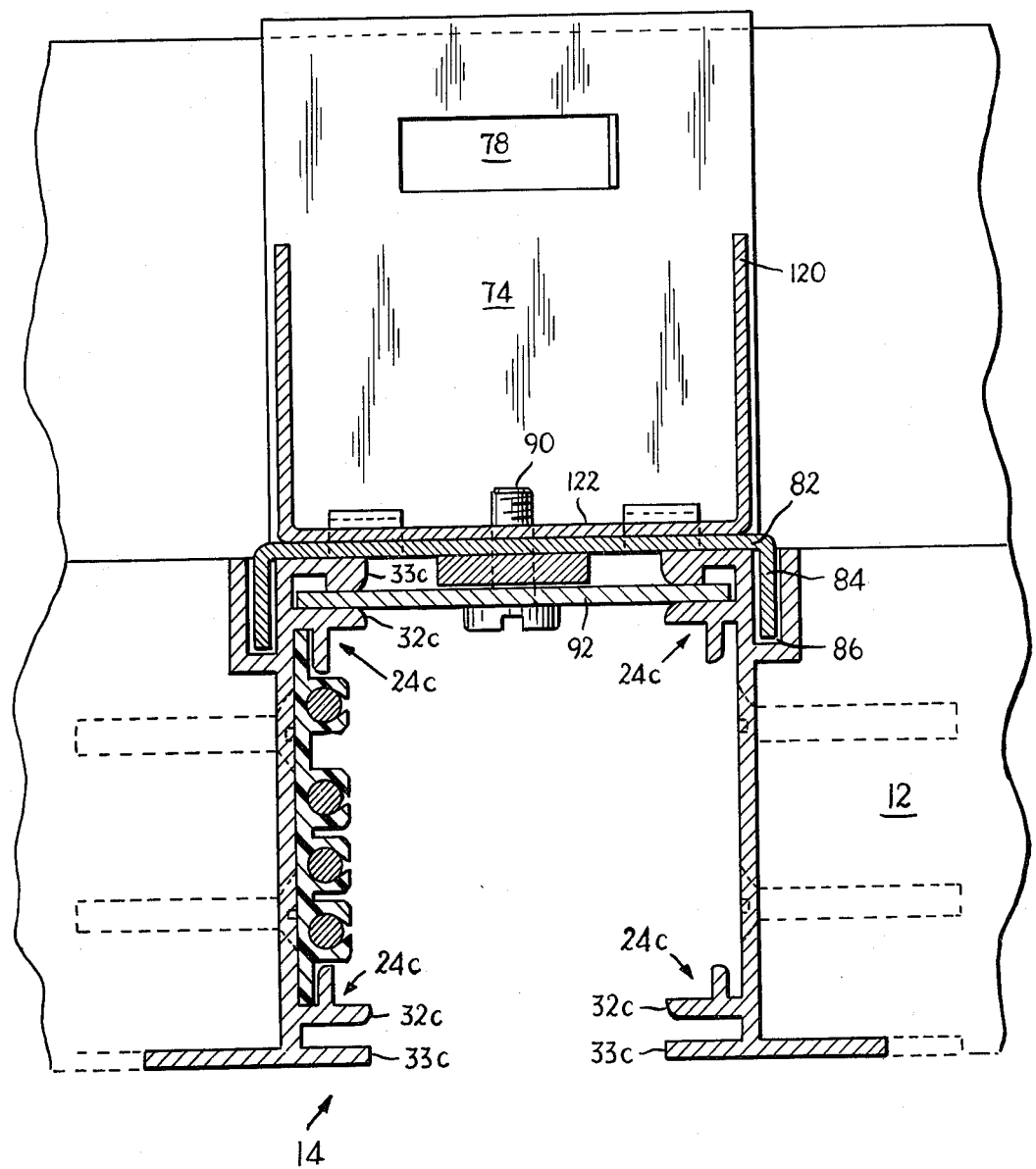
FIG. 3 is an end elevational view taken off FIG. 2 in the direction indicated by the arrow.
Figure 4:
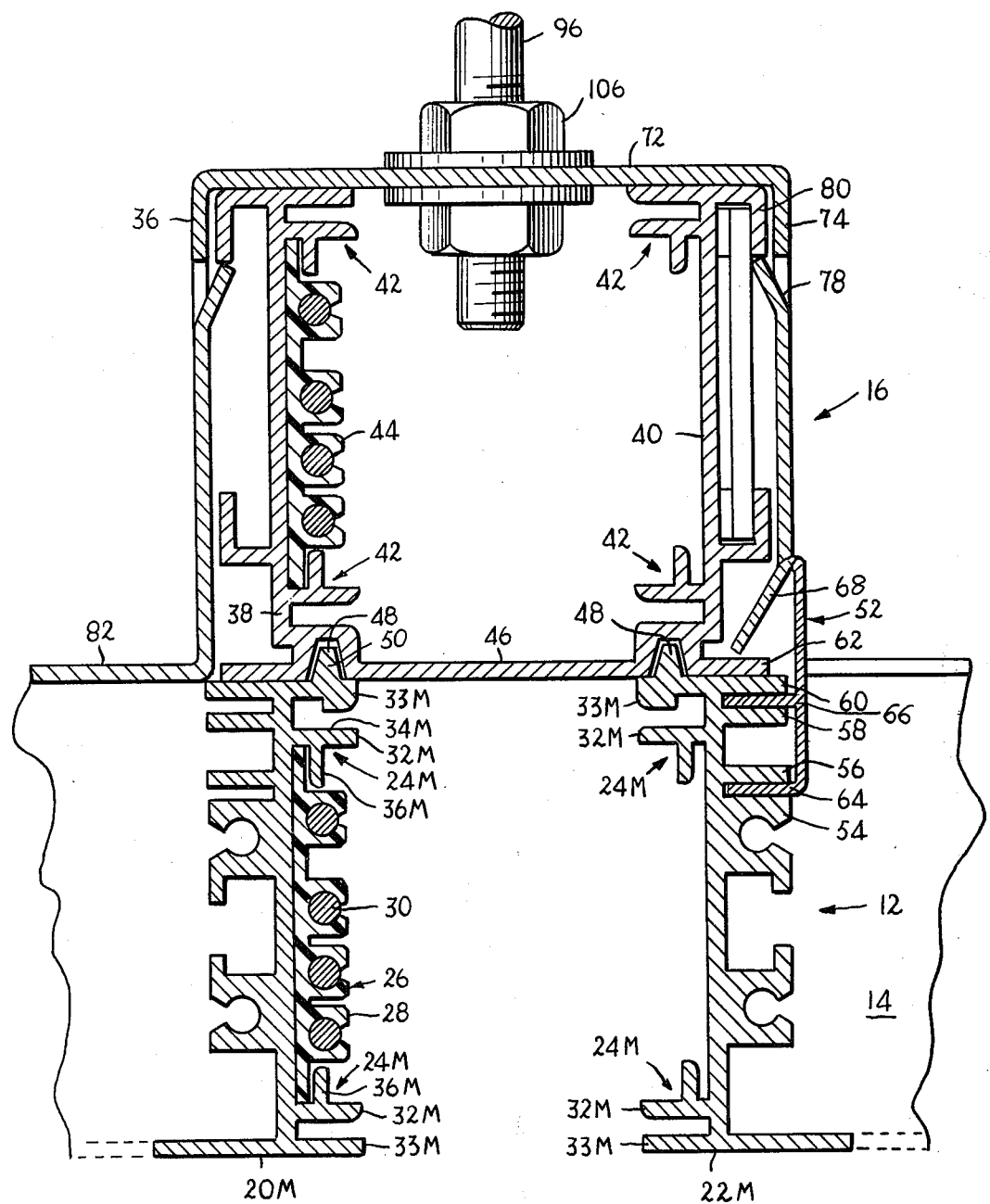
FIG. 4 is an end elevational view taken off FIG. 2 in the direction indicated by the arrow.

As FIG. 2 and associated FIGS. 3 and 4 show, each of the main runner tracks 12 and cross runner tracks 14 is symmetrical about its longitudinal axis and comprises a pair of opposed side walls 20 and 22. For purposes of simplicity, the main runner side walls are designated by numerals 20M and 22M and the cross runner side walls are designated by numerals 20C and 22C. In the subsequent description, common parts of the main and cross runners will also bear the M and C suffixes. The tracks 12 and 14 are formed of a suitable rolled or extruded material such as steel or aluminum. Each of the side walls is formed with integral guide means 24 which co-operate with the side walls to define a raceway contoured to receive and secure a cable 26 in position against the side wall. To this end, cable 26 comprises a flat, elongated member 28 formed of a suitable insulator. A plurality of vertically spaced conductors 30 are embedded within the insulator with portions of the conductor exposed through the insulation as shown in the figures to provide busbars from which power can be tapped as required to feed fixtures or receptacle boxes.

Each guide means 24 comprises a pair of vertically spaced lips 32 formed integral with each side wall and a set of lips 33. The external lips 33 define the top and bottom of the track section. Each of the interior lips 32 has a first portion 34 extending from the side wall toward the opposite side wall and a second portion 36 extending parallel to its associated side wall. Similar guide means are provided on the opposite side walls of the main runner tracks 12 as well as the side walls of the cross runner tracks 14 and the support channels 16.

As shown in FIG. 4, support channel 16 includes a pair of opposed side walls 38 and 40 spaced apart from each other a distance essentially equal to the distance between the main runner track side walls. The support channel walls are formed integral with guide means 42 which retain a cable 44, similar to cable 28, in position in a manner identical to that in which guide means 24 retain cable 28 in position. The support channel 16 is further formed with an integral base 46 extending between the side walls. Portions of base 46 define the lower lips for the guide means 42. A pair of spaced recesses 48 extend longitudinally along the base 46 of the channel track. Protrusions 50, in the form of integral ribs on the top of the main runners nest in the recesses 48 as shown in FIG. 4 to align the channel supports over the main runner tracks 12.

The outer surfaces of both the main track and channel support are contoured to retain a clip 52 in position to secure the channel support to the main track. Accordingly, a first pair of slightly spaced vertical flanges 54 and 56 and a second pair of slightly spaced vertical flanges 58 and 60 extend outwardly from the side walls of the main runner track. Similarly, a lip 62 comprising an extension of base 46 extends outwardly from the side walls of the channel support. Clip 52 includes a leg portion 64 that fits between the first pair of lips 54 and 56, a second portion 66 that fits between lips 58 and 60, and a hook portion 68 that hooks over lip 62. In this manner, the clip 52 secures the main runner to the channel support. A plurality of such clips extend along the main runners securing them to their associated channel supports.

Figure 5:
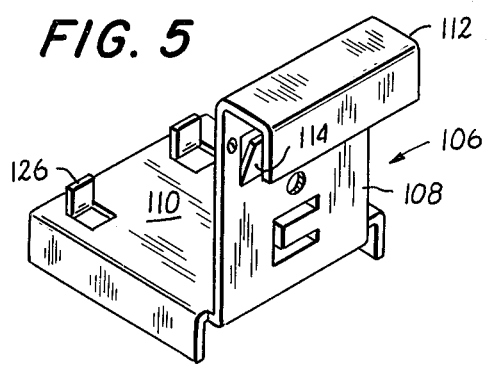
FIGS. 5 through 8 are perspective views of the various components utilized in the present system.

The cross runners 14 are secured to the channel support at each splice joint 18 by means of a U-shaped bracket 70 which is depicted in FIG. 2. A somewhat modified bracket 106, depicted in FIG. 5 and discussed in detail forthwith is used to secure the cross runners to the channel supports about the periphery of the module. Bracket 70 has a base portion 72 that spans across the side walls of the channel support 16. A pair of arms 74 and 76 extend downwardly from the base portion 72 along the side walls of the channel support. Each of the arms is provided with a tab portion 78 bent inwardly to snap behind a rail 80 formed on the outer surfaces of the channel support side walls as shown. A flange 82 extends outwardly from each arm of bracket 70 parallel to the bracket base 72 and overlying the cross members 14. The side edges 84 of bracket 82 are turned downwardly to ride in grooves 86 formed at the top of each cross runner side wall exterior surface. The bracket base 72 is secured to the cross runners by a plate 92 which is rotatably secured to the underside of each flange 82 by screw or rivet 90. The thickness of plate 92 is such as to permit it to be rotated into a position sandwiched between the top sets of flanges 32 and 33 thereby securing the bracket flanges and hence the bracket and channel support to the cross tracks.

As previously mentioned, at the periphery of module 10 (i.e., where a cross track extends in one direction only) bracket 106 (depicted in FIG. 5) is used to secure the cross track to the channel support. Bracket 106 includes an arm 108 and flange 110 that correspond to arm 74 and flange 82 of bracket 70. The free end of arm 108 is formed as a hook 112 dimensioned to extend over one side wall of the channel support. As with bracket 70, arm 108 of bracket 106 is provided with a tab 114 to engage the rail 80 of the channel side wall.

Figures 6, 7, 8:
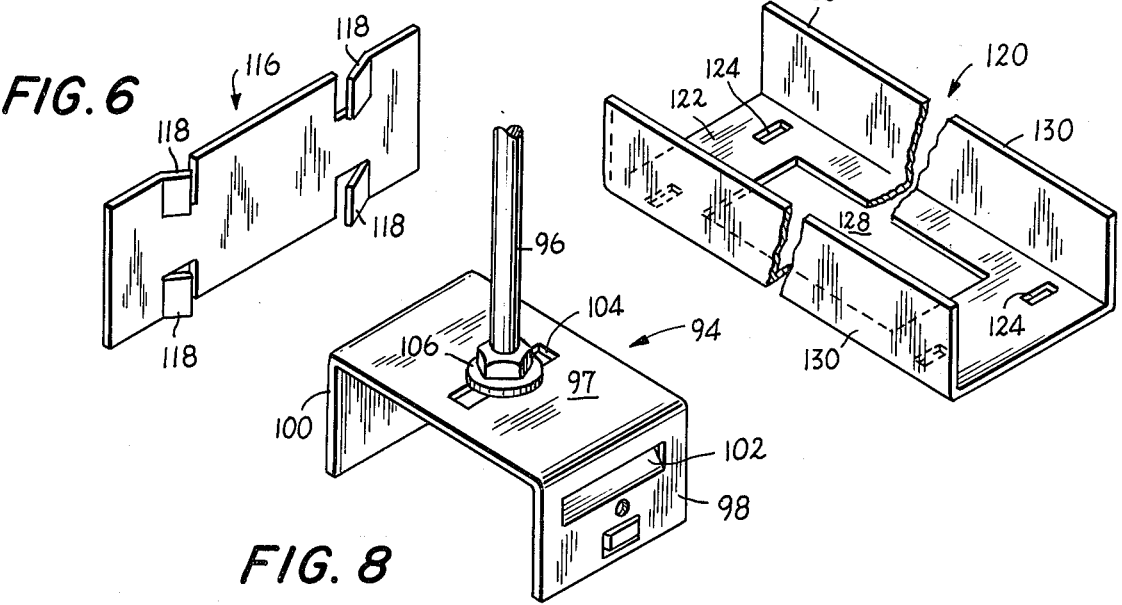

In FIG. 6 a splice plate 116 is depicted. Plate 116 comprises a generally flat member dimensioned to fit in the runway between guide 24 and a track side wall to splice lengths of track to each other. Plate 116 is provided with a biased tab 118 at each corner that exerts an outward force against the sides of the guide to lock the plate in position.

As stated, the channel supports are secured to threaded rods hanging from the ceiling. A U-shaped bracket 94, depicted in FIG. 8 serves to secure the channel support to the threaded rods 96. U-bracket 94 includes a base 97 and opposed arms 98 and 100. Each of the arms 98 and 100 includes a tab 102 designed to engage rail 80 in a manner identical with that in which tab 78 of bracket 70 engages the rail. A slot 104 is provided in the base 97 and a series of nuts and washers 106 secure the rod 96 to bracket 94.

Referring back again to FIGS. 3 and 4, it can be seen that the top of each length of the main runner track 12 and cross tracks 14 are open. The main runner track, however, is closed by the base 46 of the channel support while the cross track remains open. This may appear unsightly in certain installations when viewed from below and accordingly, a closure member in the form of a U-channel 120, depicted in FIG. 8, is provided. The U-channel consists essentially of a base 122 proportioned to span the distance between the side walls of the cross track and is co-extensive in length with the cross track. The ends of channel 120 are provided with slots 124 proportioned to receive tabs 126 of bracket 82 or 106. Closure 120 is further provided with knockout covered openings 128 and upturned walls 130. The upturned walls may be used to secure an air diffuser and duct in position over an opening 128. In this manner, the closure plate is adapted to receive a source of air (i.e., from a heating, ventilating or air conditioning unit) and direct it into the area containing the ceiling system.

Power to or from light fixtures or receptacles in partitions supported by the present suspension system is provided by connectors adapted to tap into the various buses of cables 26 and 44. In FIGS. 9 and 10, a cable assembly is shown designed to be used for this purpose. Accordingly, the connector 150 comprises an elongated, hollow, rectangular housing 152 having a partially open side 154. A first support plate 156 passes through a slot 158 defining the bottom of the opening in side 154 and an aligned slot in the side 153 of housing 152 opposite side 154. A similar plate 160 passes through a slot 162 defining the top of the opening and an aligned slot 163 in side 153. Tabs 165 are formed in the plate and are designed to be bent down to lock the plates in position as shown in FIG. 10. A sleeve 167 formed of a suitable insulating material, such as nylon, is positioned in housing 152 supported between the plates. The sleeve has an open side 164 that registers with the opening in side 154. Lips 166 are formed on the sleeve to insulate the surfaces defining the opening in side 154. A plurality of insulating spacers 168 are supported on the bottom plate 156 and retained in position below the top plate 160. Between certain of the spacers, contact blades 170 are provided. The blades are so positioned as to make contact with a particular conductor of the cable 28 as desired. Dummy, insulator blades 171 are provided aligned with the conductors not in use. Thus, while in FIG. 10 contact blades are shown contacting the top and bottom conductors only, it should be apparent that contact could be made with the intermediate conductors by dummy blades 171a and 171b with suitable contact blades. Each of the contact blades has extending from its lower surface a lead 172 which may be brought to or from a power supply source as required. To this end, the leads extend through a fitting 174 retained in position at the lower end of housing 152 by screws 176. The bottom of fitting 174 is threaded to permit connection with a fixture or receptacle junction box. The housing 152 extends through a cover 178 which is secured to plate 156 by a series of snap fasteners 180.

In use, the assembled connector is inserted into the open bottom end of the runner track 12 or cross runner track 14 with plates 156 and 160 parallel to the longitudinal axis of the track. The connector is then rotated 90 so that the outer edges of the top and bottom plates are sandwiched between flanges 32 and 33 in the manner previously described in connection with the bracket plate. The connector may be removed from the system by merely reversing the process. Thus, electrical fixtures and receptacles may readily be connected and disconnected to the system.

As stated, the present suspension system is suspended from rods 96 secured to the main structure of a building. The rods 96 are preferably five feet on center although this is not absolutely necessary since the channel support brackets 94 may be adjusted as required to catch the rods. The upper channels 16 are hung from rods 96 by means of brackets 94 as previously described. After the upper channels are in place, the four conductor cable 44 is pulled through the raceway provided for it. Brackets 74 are then suspended from the upper channel preferably on five foot centers. A preformed modular unit 10 comprising main runners 12 and cross runners 14 as shown in FIG. 1 is then supported from the upper channels in the manner previously described. The modular unit is prewired with a continuous cable 28 extending through both the main runner and cross runner tracks. These cables are then tied into the support channel cables and power is brought to and from the conductors of cables 28 and 44 by connectors such as 150. The installation is then completed by suspending ceiling tiles and/or fixtures on shelves 190 formed integral with the track members.

Thus, in accordance with the above, the aforementioned objects are effectively attained.

Having thus described the invention, what is claimed is:

1. A suspension ceiling system including: a plurality of track members; each of said track members having generally parallel opposed side walls; guide means spaced apart from and co-extensive with at least one of said side walls; electrical cable means co-extensive with and retained in position between said one side wall and said guide means; and, air diffuser support means secured to the top of said side walls, said support means including a base member spanning the space between said opposed side walls, an opening in said base member and spaced side members extending upwardly from said base member, said side member defining therebetween a channel to receive an air diffuser.

2. The invention in accordance with claim 1 wherein said guide means comprises a pair of vertically spaced lips secured to said one side wall, said lips and one side wall cooperating in defining a raceway extending along said track members.

3. The invention in accordance with claim 2 wherein each of said lips includes a first portion extending from said one side wall toward the other side wall and a second portion extending parallel to said side wall from said first portion toward said other lip.

4. The invention in accordance with claim 3 wherein said cable comprises a generally flat elongated insulator member secured against said one side wall by the second portions of said lips.

5. The invention in accordance with claim 4 further comprising a plurality of vertically spaced parallel conductors extending longitudinally through said insulator.

6. The invention in accordance with claim 5 comprising four identical track members mutually perpendicular to each other to form a rectangular perimeter, means connecting adjacent track members to one another and means connecting the corresponding conductors of said track members to one another.

7. The invention in accordance with claim 6 further comprising: means interposed between said perimeter and a ceiling supporting said rectangular perimeter to said ceiling, said supporting means including: an elongated support channel, said channel having generally parallel longitudinally extending opposed side walls; means for securing said support channel to said ceiling; and means for securing said perimeter to said support channel.

8. The invention in accordance with claim 7 further comprising guide means co-extensive with and spaced apart from at least one of said support channel side walls, cable means co-extensive with and retained in position between said channel one side wall and said support channel guide means, said channel cable comprising a plurality of conductors equal in number to said track cable conductors and means connecting said track cable conductors to corresponding conductors of said channel cable.

9. The invention in accordance with claim 7 wherein said support channel is disposed parallel to an opposed pair of track members of said rectangular perimeter and overlying one of the track members of said pair and said means for securing said support channel to said track includes a longitudinal clip receiving means along the side walls of said channel, a longitudinal clip securing means along the side walls of said one of the track members of said pair, and clip means extending between said channel and track clip receiving means.

10. The invention in accordance with claim 9 wherein said channel clip receiving means comprises a first lip extending from each of said channel walls away from the opposite wall and said clip includes a hooked top portion to hook over said lip.

11. The invention in accordance with claim 10 further comprising: a second lip extending from each of said channel walls away from the opposite wall; bracket means having a first portion engaging said second lip and a second portion including means therein engaging one of the remaining track members of said perimeter.

12. The invention in accordance with claim 11 wherein said bracket is U-shaped having a base portion, a pair of arms extending from opposite ends of said base, and a pair of flanges extending from said arms parallel to said base; said remaining track member has a pair of opposed side walls each having a pair of vertically spaced flanges directed toward the opposite side wall; and said bracket flanges each have a plate rotatably mounted thereto, each of said plates being rotatable to a position sandwiched between the flanges of said one of the remaining track members when said bracket base portion overlies a support channel so that a bracket flange overlies a remaining track member.

13. The invention in accordance with claim 12 wherein said means for securing said channel support to a ceiling includes a U-shaped bracket having a base portion and a pair of arms extending from opposite sides of said base, clip means formed integral with each of said arms adapted to engage said second lip means, an opening extending through said bracket base, a threaded rod suspended from said ceiling through said opening, and means for securing said threaded rod to said base.

14. The invention in accordance with claim 5 wherein each of said side walls includes guide means and further comprising flange means spaced vertically apart from each first lip portion of each of said side walls, each flange and associated lip first portion defines therebetween a groove whereby said track member includes a first pair of grooves directed toward each other on opposite side walls and a second pair of grooves vertically spaced from said first set of grooves directed toward each other on said opposite side walls.

15. The invention in accordance with claim 14 further comprising electrical connector means for tapping into said cable, said connector comprises a hollow elongated housing generally rectangular in plan, a pair of vertically spaced plates extending transversely through said housing, each of said plates having opposed end portions, the end portions of one plate being captured by one pair of grooves and the end portions of the other housing being captured by the other pair of grooves; a vertically extending opening in said housing extending between said plates; a plurality of spacer lugs formed of insulating material disposed between said plates, at least one tab of electrically conductive material disposed between two adjacent lugs, said tab having a portion extending through said opening to contact a conductor of said cable, and an electrically conductive lead connected to said tab extending through the hollow interior of said connector.

16. The invention in accordance with claim 15 comprising a plurality of electrically conductive tabs disposed between pairs of spacers, each of said tabs being vertically aligned with and extending through said opening to contact a conductor of said cable.

* * * * *